United States Patent
Yang

(10) Patent No.: US 10,633,967 B2
(45) Date of Patent: Apr. 28, 2020

(54) MODULAR SYSTEM FOR GEOSTEERING AND FORMATION EVALUATION

(71) Applicant: Oliden Technology, LLC, Sugar Land, TX (US)

(72) Inventor: Jian Yang, Sugar Land, TX (US)

(73) Assignee: Oliden Technology, LLC, Stafford, TX (US)

( * ) Notice: Subject to any disclaimer, the term of this patent is extended or adjusted under 35 U.S.C. 154(b) by 285 days.

(21) Appl. No.: 15/286,256

(22) Filed: Oct. 5, 2016

(65) Prior Publication Data

US 2017/0102478 A1    Apr. 13, 2017

Related U.S. Application Data

(60) Provisional application No. 62/238,633, filed on Oct. 7, 2015.

(51) Int. Cl.
*G01V 3/28* (2006.01)
*E21B 47/12* (2012.01)
*G01V 3/30* (2006.01)

(52) U.S. Cl.
CPC .............. *E21B 47/122* (2013.01); *G01V 3/30* (2013.01)

(58) Field of Classification Search
CPC ................................ E21B 47/122; G01V 3/30
See application file for complete search history.

(56) References Cited

U.S. PATENT DOCUMENTS

| | | | | |
|---|---|---|---|---|
| 2005/0024231 A1* | 2/2005 | Fincher | ................. | E21B 17/028 340/854.4 |
| 2010/0213942 A1* | 8/2010 | Lazarev | ................. | E21B 17/028 324/333 |
| 2011/0133740 A1* | 6/2011 | Seydoux | ................. | G01V 3/28 324/338 |
| 2011/0140701 A1 | 6/2011 | Legendre | | |
| 2012/0249149 A1* | 10/2012 | Bittar | ................... | E21B 47/026 324/337 |
| 2013/0088364 A1* | 4/2013 | Bittar | ..................... | E21B 47/01 340/856.3 |
| 2015/0226057 A1* | 8/2015 | Bonavides | ............ | E21B 43/116 340/854.4 |
| 2015/0280447 A1* | 10/2015 | Akuzawa | ................ | H01F 38/18 307/104 |

(Continued)

*Primary Examiner* — Christopher P McAndrew
*Assistant Examiner* — Zannatul Ferdous
(74) *Attorney, Agent, or Firm* — Bryan L. White

(57) ABSTRACT

A downhole electromagnetic modular system has two or more antenna modules incorporated into a drill string, each antenna module comprising an antenna sub and an antenna. The antenna modules may be spaced apart by one or more spacer modules, battery modules, spacer-battery modules, and/or downhole tools. The connected modules (and/or downhole tools) provide an electrical pathway throughout the modular system. An antenna module may have an inner connector formed on its antenna sub between the antenna of that antenna module and a retainer of that antenna sub. An antenna module may have two antenna groups located towards opposite ends of the antenna module and spaced apart by more than half the length of the antenna module. If an antenna group has more than one antenna, those antennas may be co-located or in proximity to one another. A probe may be held fixed by the retainer of the inner pin connector.

22 Claims, 11 Drawing Sheets

(56) References Cited

U.S. PATENT DOCUMENTS

| | | | | |
|---|---|---|---|---|
| 2015/0288153 A1* | 10/2015 | Baldauf | ............... | H02G 1/1256 29/828 |
| 2015/0301218 A1* | 10/2015 | Donderici | ................ | G01V 3/18 324/339 |
| 2016/0202385 A1* | 7/2016 | Pelletier | ................ | E21B 47/102 250/256 |
| 2016/0273339 A1* | 9/2016 | Wu | .......................... | G01V 3/26 |

* cited by examiner

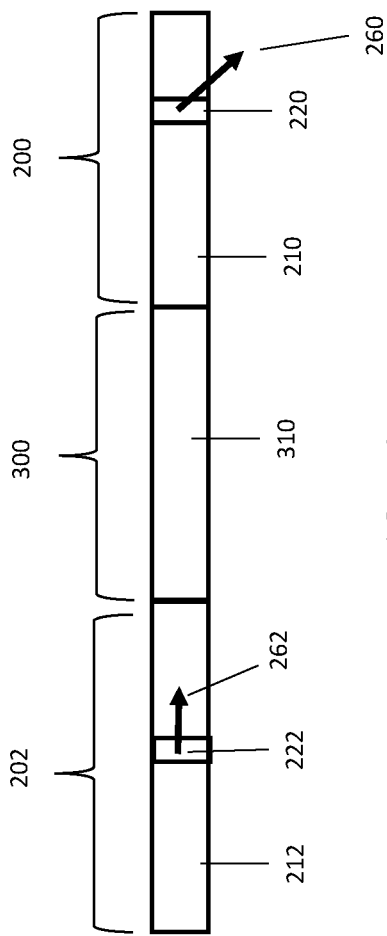
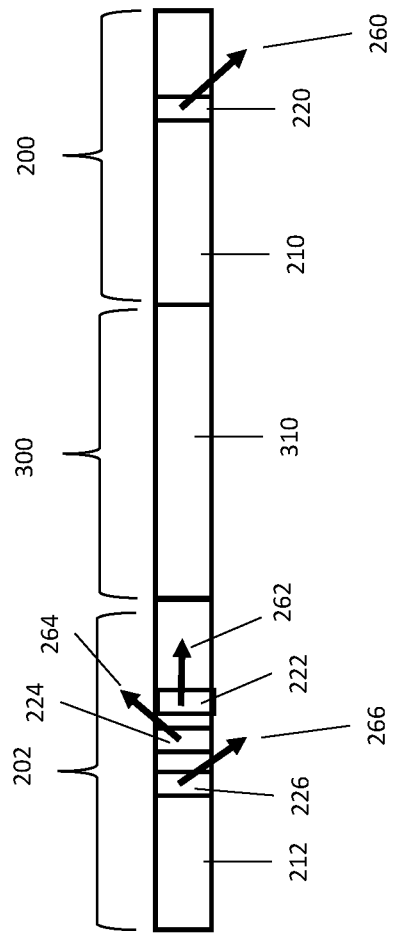

MODULAR SYSTEM FOR GEOSTEERING AND FORMATION EVALUATION

CROSS-REFERENCE TO RELATED APPLICATIONS

This application claims, under 35 U.S.C. § 119, priority to and the benefit of U.S. Provisional Patent Application No. 62/238,633, filed Oct. 7, 2015.

FIELD OF THE INVENTION

The present disclosure relates generally to the field of logging tools and particularly to electromagnetic logging tools. More specifically, a modular system for formation evaluation and well placement applications is disclosed.

BACKGROUND

Various well logging techniques are known in the field of hydrocarbon exploration and production. These techniques use instruments or tools equipped with transmitters adapted to emit energy into a subsurface formation that has been penetrated by a borehole. In this description, "instrument" and "tool" will be used interchangeably to indicate, for example, an electromagnetic instrument (or tool), a wireline tool (or instrument), or a logging-while-drilling tool (or instrument). The emitted energy interacts with the surrounding formation to produce signals that are then detected and measured by one or more sensors. By processing the detected signal data, a profile of formation properties can be generated.

Electromagnetic logging tools, including electromagnetic induction and wave propagation logging tools, are used to determine the electrical properties of formations surrounding a borehole. Such logging tools obtain measurements relating to the resistivity (or its inverse, conductivity) of the formation that, when interpreted, allow one to infer various petrophysical properties of the formation and fluids therein. The physical principles of electromagnetic induction resistivity well logging are well known.

Electromagnetic logging tools use transmitter and receiver antennas. In some embodiments, such antennas may be operable as a transmitter and/or a receiver. Those skilled in the art will appreciate that an antenna may be used as a transmitter at one instant and as a receiver at another. It will also be appreciated that the transmitter-receiver configurations disclosed herein are interchangeable due to the principle of reciprocity, i.e., the "transmitter" may be used as a "receiver", and vice-versa.

Conventional electromagnetic logging tools employ axial transmitter and receiver antennas having magnetic dipole moments substantially along the longitudinal axis of the tool. Such tools do not have azimuthal sensitivity. In high angle or horizontal wells, measurements obtained with axial antennas do not contain information about the directionality of the formation that allows distinguishing whether the borehole is approaching, for example, an electrically conductive layer from above or below. Such information is used, for example, in well placement applications. Logging tools comprising one or more antennas having a magnetic dipole moment tilted or transverse with respect to the tool axis, such as those described, for example, in U.S. Pat. Nos. 5,508,616, 6,163,155, 6,476,609, 7,656,160, 8,466,683, 7,755,361, U.S. Pat. Pub. No. 20140292340, and U.S. Pat. No. 9,389,332 have been proposed. Such logging tools can provide a directional measurement containing information about the directionality of the formation. It further provides more information used for various formation evaluation applications.

FIG. 1 illustrates a prior art drilling system 100. The drilling system 100 shown includes a drilling rig 10 positioned over a wellbore 11. A drilling tool assembly, which may include a drill string 12 and a drill bit 15 coupled to the lower end of drill string 12, may be disposed in wellbore 11. Drill string 12 and bit 15 may be rotated by a kelly 17 coupled to the upper end of drill string 12. The kelly 17 may be rotated by engagement with a rotary table 16 disposed on the drilling rig 10. The kelly 17 and the drill string 12 may be suspended by a hook 18 coupled to the kelly 17 by a rotatable swivel 19.

Drilling fluid may be stored in a pit 27 and may be pumped through the center of drill string 12 by a mud pump 29 to flow downwardly (shown by arrow 9). After circulation through bit 15, the drilling fluid may circulate upwardly (indicated by arrow 32) through an annular space between wellbore 11 and drill string 12. Flow of the drilling mud may lubricate and cool bit 15 and lift drill cuttings made by bit 15 to the surface for collection and disposal.

A bottom hole assembly (BHA) 110 may be connected to drill string 12. The bottom hole assembly 110 may include a stabilizer 140 and a sub 130, which may be coupled to a local measuring device 120. The bottom hole assembly 110 may also include a downhole communications system 150, such as a pressure modulation (mud pulse) telemetry system. Pressure modulation telemetry can include various techniques for selectively modulating the flow (and consequently the pressure) of the drilling mud. The drill string 12 can also (or alternatively) comprise wired drill pipes that support high-speed telemetry between the surface and downhole tools.

A transducer 31 disposed at the earth's surface may be configured to detect pressure variations and to conduct signals to an uplink telemetry subsystem 90 for demodulation and interpretation. The demodulated signals may be forwarded to a processor 85 and a recorder 45 for further processing and/or storage. The surface equipment may optionally include a downlink telemetry subsystem 95, which may include a pressure modulation transmitter (not detailed) that can modulate the pressure of the drilling mud circulating downwardly to communicate control signals to the bottom hole assembly 110. It should be understood that the mud telemetry described above is one example of a communication means. Other telemetry systems known in the art may also be used.

The downhole communications system 150 may also include various types of processors and controllers (not shown) for controlling the operation of sensors disposed therein, for communicating command signals to the local measuring device 120, and for receiving and processing measurements transmitted from the local measuring device 120. Sensors in bottom hole assembly 110 and/or downhole communications system 150 may include magnetometers, accelerometers, gyro-meters, and the like.

Various instruments disposed in the bottom hole assembly 110, the downhole communications system 150, and the local measuring device 120 may be referred to collectively as a logging-while-drilling (LWD) tool or measurement-while-drilling (MWD) tool. The bottom hole assembly 110, the processor 85, and/or the downhole communications system 150 may include various forms of data storage or memory that can store measurements made by any or all of the sensors, including sensors disposed in the local measuring device 120, for later processing during or after the drill string 12 is withdrawn from wellbore 11. In one implementation, the LWD or MWD tool may be a propagation resistivity tool. As such, the bottom hole assembly 110, the downhole communications system 150, and the local measuring device 120 may be used to obtain well log data obtained from various transmitter-receiver pairs (to be discussed further below) and at multiple frequencies. Such data may be communicated to the surface while the LWD or MWD tool is downhole or stored in the LWD or MWD tool for later readout.

SUMMARY

A downhole electromagnetic modular system has two or more antenna modules incorporated into a drill string, each antenna module comprising an antenna sub and an antenna. The antenna modules may be spaced apart by one or more spacer modules, battery modules, spacer-battery modules, and/or downhole tools. The connected modules (and/or downhole tools) provide an electrical pathway throughout the modular system. An antenna module may have an inner connector formed on its antenna sub between the antenna of that antenna module and a retainer of that antenna sub. An antenna module may have two antenna groups located towards opposite ends of the antenna module and spaced apart by more than half the length of the antenna module. If an antenna group has more than one antenna, those antennas may be co-located or in proximity to one another. A probe may be held fixed by the retainer of the inner pin connector.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components. Embodiments of a system and method to determine all nine elements of an electromagnetic (EM) tensor are described with reference to the following figures.

FIG. 7A is a schematic drawing of the modular system of FIG. 2A showing, for that embodiment, the direction of the magnetic moment of each antenna, in accordance with the present disclosure.

FIG. 7B is a schematic drawing of the modular system of FIG. 2A, but with additional antennas in one antenna module, showing the direction of the magnetic moment of each antenna, in accordance with the present disclosure.

DETAILED DESCRIPTION

Figure 1:
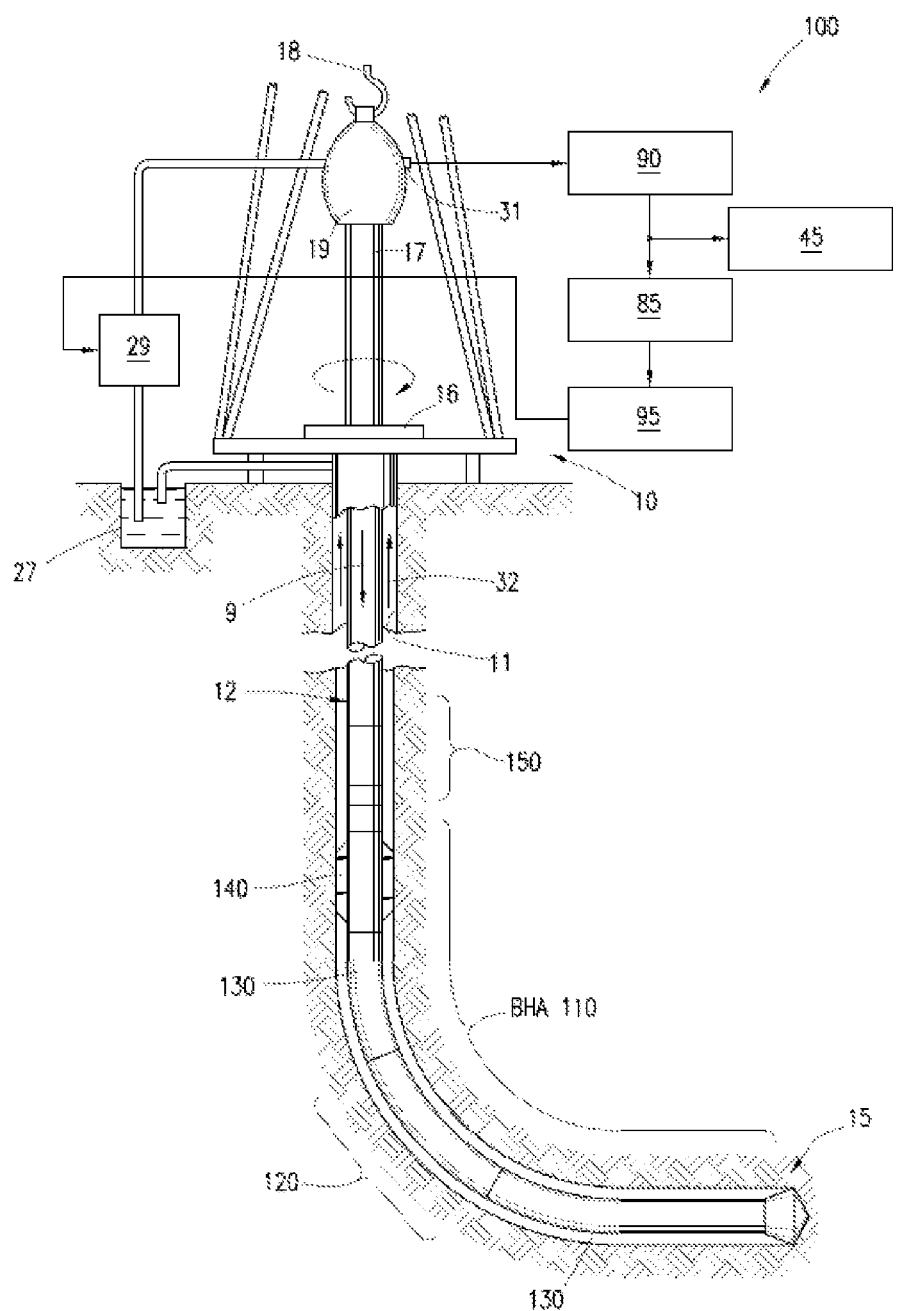
FIG. 1 is schematic drawing of a prior art drilling system.

In the following description, numerous details are set forth to provide an understanding of the present disclosure. However, it will be understood by those skilled in the art that the present disclosure may be practiced without these details and that numerous variations or modifications from the described embodiments are possible.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate, where "up" is the position in a tool string relatively more proximal to surface equipment, and "down" is the position in the tool string relatively more proximal to the bottom hole assembly.

A system and method for formation evaluation and well placement applications using a modular system in a wellbore is disclosed herein. The modular system may comprise one or more antenna modules and, optionally, one or more spacer modules. In at least some embodiments, one antenna module comprises an antenna and an (e.g., threaded) inner connector formed on the external or internal surface of the antenna sub and positioned axially in between the antenna and one end of the antenna sub, referred to herein as the retainer or retainer end. As an example, the inner pin connector of one antenna module is connectable to a box connector of a spacer module or another antenna module such that the retainer is received inside the spacer sub of the spacer module or the antenna sub of the other antenna module. One or more of the antenna modules may use replaceable antennas.

In at least one embodiment, the modular formation evaluation/well placement system comprises a first antenna module, a second antenna module, and a spacer module which separates the first and the second antenna modules, forming a portion of the tool string. Each antenna module comprises an antenna sub having at least one antenna mounted thereon or therein. A sub has an elongated body with tubular walls, a central bore, a longitudinal axis, and two ends, and is made of high-strength material (such as stainless steel). The spacer module comprises a sub that can establish at least one electrical pathway through and within the spacer sub. The spacer modules are available in various lengths. Generally speaking, the depths of investigation or detection ranges increase as the spacing between the transmitter antenna and the receiver antenna increases. Thus one can select one or more spacer modules with suitable lengths to meet the desired depth of investigation or detection range for a specific application. The availability of various lengths of spacer modules removes the limitation that the spacing between antenna modules is limited by the length of a downhole measurement tool. The shortest spacer module may only need to receive the retainer end of the antenna module to which it is connected, without necessarily comprising any electrical pathway structure, and may be as simple as something similar to a standard crossover sub that allows different sizes and types of drill pipes to be joined.

In another embodiment the modular formation evaluation/well placement system may further comprise a battery module that provides electrical power to at least one of the modules. The battery module comprises a sub with one or more battery units, (optionally) some controlling electronics, and at least one electrical pathway from a battery unit to some other module. The battery module further includes at least one electrical pathway through and within the battery module sub. The battery module does not have to be located between the antenna subs. The battery module mitigates the limiting factor of power consumption of the modular system, as large power usage is typically required by an antenna transmitting an electromagnetic signal into a formation.

A spacer module and a battery module may be combined to produce an integral spacer-battery module. A spacer-battery module may separate first and second antenna modules, and those combined components may form part of a drill string. The spacer-battery module comprises a sub having, through and within the sub, at least one electrical pathway for electrical power, a ground cable, and a communication cable. The spacer-battery module comprises one or more battery units and (optionally) some controlling electronics. At least one electrical pathway goes from a battery unit to at least one side of the spacer-battery module, and provides electrical power to one or more antenna modules in the modular system.

In accordance with at least one embodiment, an antenna module comprises an antenna and an inner threaded pin connector formed on the external surface of the sub and positioned axially between the antenna and a retainer end of the antenna sub of the antenna module. In accordance with at least one embodiment, an antenna module comprises an antenna and an inner threaded box connector formed on the internal surface of the sub and positioned axially between the antenna and an alignment end of the antenna sub of the antenna module.

In accordance with at least one embodiment, a spacer module comprises a probe or a pressure barrel assembly connected by one or more pressure barrels similar to, but not limited by, those commonly used in MWD tools. One or more pressure barrels in the pressure barrel assembly may further comprise one or more battery units commonly used in MWD tools to make the spacer module into a spacer-battery module. The pressure barrel assembly may have one or more centralizers to position and maintain the pressure barrel assembly centered within the sub once disposed therein. One or more electrical conductors may be placed inside the pressure barrel assembly for protection from the drilling fluid (mud) present between the pressure barrel assembly and the sub. A battery module can be designed and used in a manner similar to a spacer-battery module. The differences between a battery module and a spacer-battery module at least include: (1) a battery module is not necessarily positioned between the two antenna modules; and (2) a battery module length is essentially determined by the number of battery units it has. In the following discussion, we may use the term "spacer module" to refer to a spacer module, a battery module, or a spacer-battery module. It should be clear from the context what module or modules are being referred to in the discussion.

In accordance with at least one embodiment, a modular formation evaluation/well placement system has one or more electrical pathways for a signal carrying clock information to be communicated from one antenna module to another antenna module. The signal may be, for example, an analog-to-digital converter (ADC) clock signal, a local oscillator signal, or a sinusoidal signal whose frequency is controlled by the same clock used to control the frequency of an electromagnetic signal transmitted from an antenna into a formation. Some of the signals may be differential signals. A phase-locked loop or other control system may be used on the receiving side, as is known to those skilled in the art.

In accordance with at least one embodiment, when making-up a bottom hole assembly, the inner pin connector of an antenna module is connected to the upper side of a box connector of a spacer module such that part of the antenna sub (the retainer) is inside the spacer sub. When fully connected, the topmost centralizer affixed to the pressure barrel assembly of the spacer module is constrained by the lowermost end of the retainer of the antenna module, preventing the pressure barrel assembly from moving upward relative to the spacer sub.

In accordance with at least one embodiment, the spacer sub may further comprise a landing shoulder formed on an inner surface of the spacer sub, and the pressure barrel assembly of the spacer module may further comprise a landing centralizer affixed near one end of the pressure barrel assembly. When the pressure barrel assembly is positioned in the spacer sub of the spacer module, the landing centralizer lands on the landing shoulder of the spacer sub.

In accordance with at least one embodiment, an antenna module comprises at least one antenna having an axial magnetic moment (i.e., oriented substantially parallel to the axis of the antenna sub), a tilted magnetic moment (i.e., oriented neither parallel nor orthogonal to the axis of the antenna sub), or a transverse magnetic moment (i.e., oriented substantially orthogonal to the axis of the antenna sub). Most any antenna design such as those described in U.S. 2014/0292340 can be used on an antenna module. The antenna sub may comprise a plurality of grooves of reduced radial dimension relative to the external surface of the antenna sub, and a plurality of lands of radial dimension similar to the external surface of the antenna sub spaced around the sub. The antenna sub may also comprise an antenna pathway traversing the plurality of grooves and plurality of lands around the antenna sub, and a coil may be disposed in the antenna pathway.

In at least one embodiment, a replaceable antenna assembly can be used on an antenna module. The replaceable antenna assembly includes an antenna sub, a slide-on antenna that can be installed on the antenna sub, and a (e.g., threaded) retainer ring (see U.S. Pat. No. 9,213,125) to secure the slide-on antenna on the antenna sub. The slide-on antenna is replaceable as it can be removed from the antenna sub. The slide-on antenna comprises a (e.g., metallic) tubular mechanical support having an external surface, a plurality of grooves of reduced radial dimension relative to the external surface of the tubular, and a plurality of lands of radial dimension similar to the external surface of the tubular, spaced around the tubular. In accordance with at least one embodiment, the grooves having reduced radial dimension may pass completely through the thickness of the tubular. The slide-on antenna may also include an antenna pathway traversing the plurality of grooves and plurality of lands around the tubular support, and a coil may be disposed in the antenna pathway. The coil may be an axial coil, a tilted coil, or a transverse coil, whereby those "directional" terms are defined in terms of the coil's magnetic moment as described above. In accordance with at least one embodiment, the slide-on antenna has at least one axial groove (i.e., oriented substantially parallel to the longitudinal axis of the tubular mechanical support), or at least one tilted groove (i.e., oriented along a direction neither parallel nor orthogonal to the longitudinal axis of the tubular mechanical support), or at least one transverse groove (i.e., oriented orthogonal to the longitudinal axis of the tubular mechanical support).

Figure 2A:
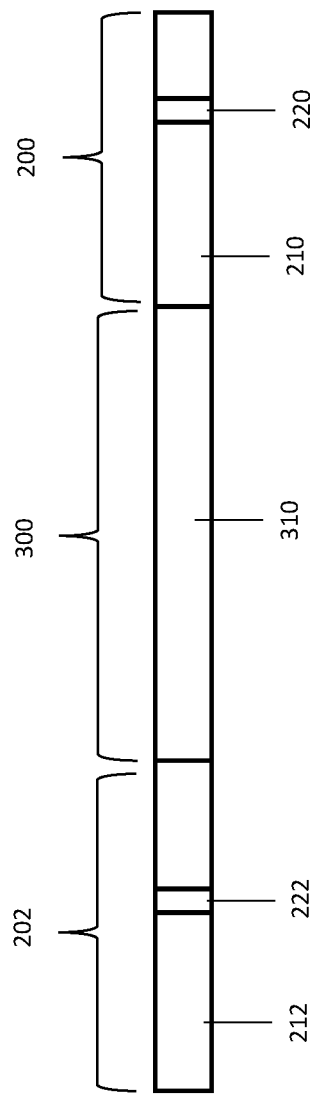
FIG. 2A is a schematic drawing of an embodiment of a modular system having two antenna modules spaced apart by a spacer module, in accordance with the present disclosure.

FIG. 2A is a schematic drawing of an embodiment of a modular system having two antenna modules spaced apart by a spacer module. A first antenna module 200 and a second antenna module 202 are spaced apart in a tool string by a spacer module 300. Each antenna module 200 (or 202) comprises a sub 210 (or 212) having at least one antenna 220 (or 222) mounted thereon or therein. The spacer module 300 comprises a sub 310 having, through and within the sub 310, at least one electrical pathway for at least one of electrical power path, ground path, and communication path between the first antenna module 200 and the second antenna module 202. Although FIG. 2A shows only one spacer module 300, multiple spacer modules can be connected and placed in between the two antenna modules.

Figure 2B:
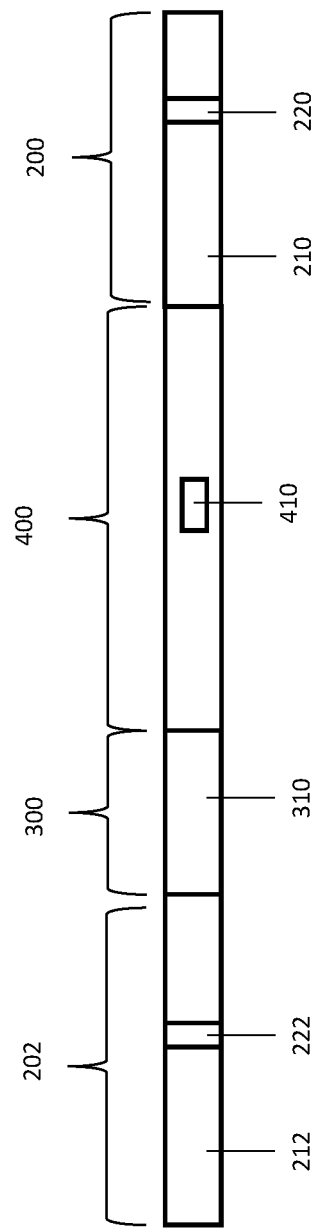
FIG. 2B is a schematic drawing of an embodiment of a modular system having two antenna modules spaced apart by a spacer module and another downhole measurement tool, in accordance with the present disclosure.

FIG. 2B is a schematic drawing of an embodiment of a modular system having a first antenna module 200 and a second antenna module 202 spaced apart in a tool string by a spacer module 300 and a downhole measurement tool 400. Downhole measurement tool 400 includes a sensor such as a gamma detector 410. The spacer module 300 comprises a spacer sub 310 that provides at least one electrical pathway, through and within the spacer sub 310, between the second antenna module 202 and the downhole measurement tool 400. The electrical pathway allows for at least one of electrical power path, ground path, and communication path.

Figure 3A:
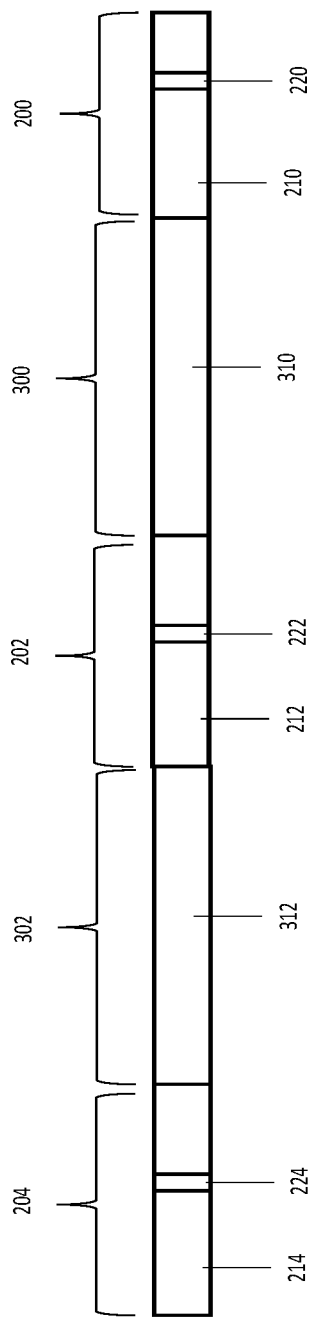
FIG. 3A is a schematic drawing of an embodiment of a modular system having three antenna modules spaced apart by two spacer modules, in accordance with the present disclosure.

FIG. 3A is a schematic drawing of an embodiment of a modular system having a first antenna module 200, a second antenna module 202, and a third antenna module 204. The first antenna module 200 and the second antenna module 202 are spaced apart by a first spacer module 300. The third antenna module 204 is spaced apart from the second antenna module 202 by a second spacer module 302. Each antenna module 200 (or 202 or 204) comprises an antenna sub 210 (or 212 or 214) having at least one antenna 220 (or 222 or 224) mounted thereon or therein. The first spacer module 300 comprises a spacer sub 310 having at least one electrical pathway, through and within spacer sub 310, between the first antenna module 200 and the second antenna module 202, including at least one of electrical power path, ground path, and communication path. The second spacer module 302 comprises a spacer sub 312 having at least one electrical pathway, through and within spacer sub 312, between the second antenna module 202 and the third antenna module 204, including at least one of electrical power path, ground path, and communication path.

Figure 3B:
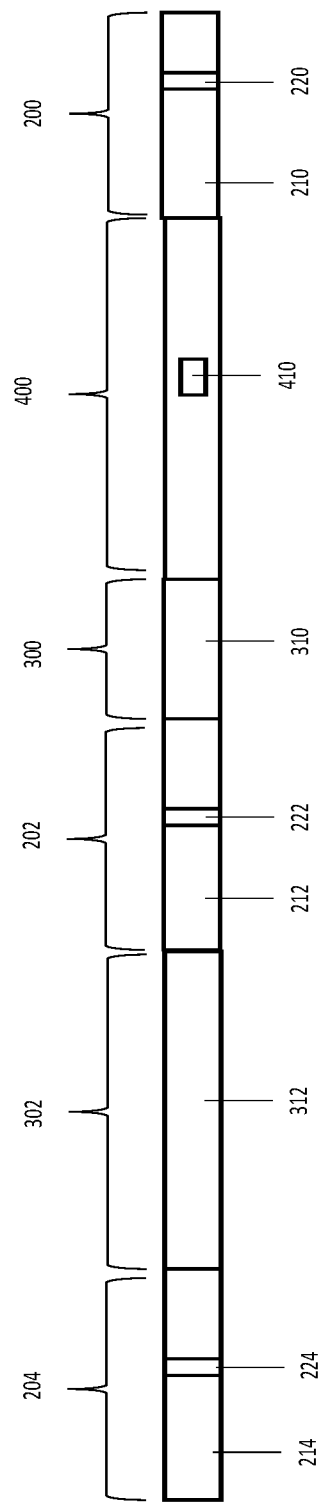
FIG. 3B is a schematic drawing of an embodiment of a modular system having three antenna modules spaced apart by two spacer modules and one downhole measurement tool, in accordance with the present disclosure.

FIG. 3B is a schematic drawing of an embodiment of a modular system having three antenna modules spaced apart by two spacer modules and one downhole measurement tool. The first antenna module 200 and the second antenna module 202 are spaced apart by a downhole measurement tool 400 and a spacer module 300.

Figure 4A:
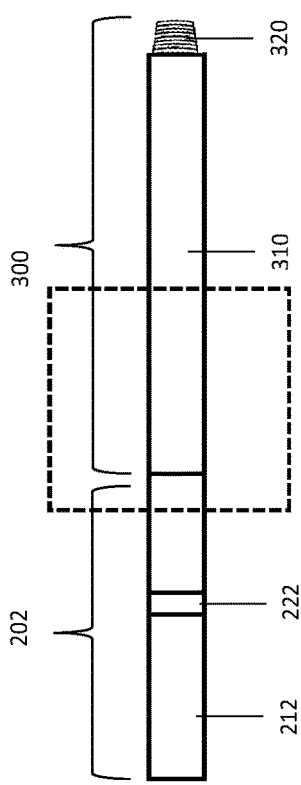
FIG. 4A is a schematic drawing of one end of the modular system of FIG. 2A showing an antenna module and a spacer module connected together, in accordance with the present disclosure.

FIG. 4A is a schematic drawing of one end of the modular system of FIG. 2A showing an antenna module and a spacer module connected together. Antenna module 202 and a spacer module 300 are connected to one another. The antenna module 202 comprises an antenna sub 212 having at least one antenna 222 mounted thereon or therein. The spacer module 300 comprises a spacer sub 310 and the spacer sub 310 has a standard API pin connector 320 at one end. Spacer sub 310 also has at least one electrical pathway through and within the spacer sub 310 for at least one of electrical power path, ground path, and communication path.

Figure 4B:
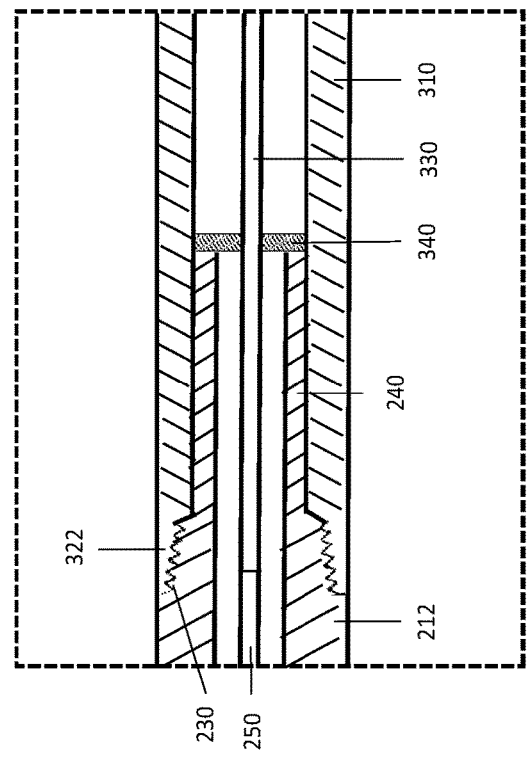
FIG. 4B is an enlarged cross-sectional view of the connection shown in FIG. 4A, in accordance with the present disclosure.

FIG. 4B is an enlarged cross-sectional view of the connection shown in FIG. 4A, specifically the connection area outlined by dashed lines on FIG. 4A. An inner pin connector 230 of the antenna module 202 is connected with a box connector 322 of the spacer module 300. When connected, a centralizer 340 is constrained from above by retainer 240 at one end of antenna module 202, preventing the pressure barrel assembly 250 from moving upward relative to the spacer sub 310. Optionally, one may incorporate a spring (not shown) into the centralizer 340 to provide an axial force against the retainer 240 when the inner pin connector 230 and the box connector 322 are fully engaged. In accordance with at least one embodiment, the end of the retainer 240 may be tapered radially outward or radially inward to steer a correspondingly radially inward or radially outward tapered end of the centralizer 340.

Figure 5A:
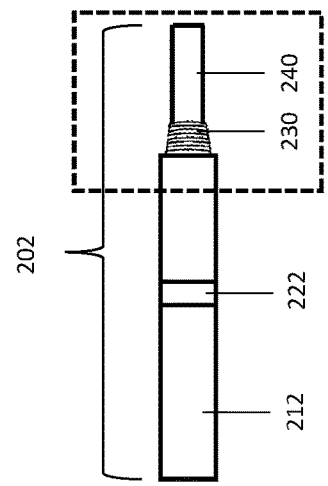
FIG. 5A is a schematic drawing of the end of the antenna module of FIG. 4A disconnected from the spacer module of FIG. 4A, in accordance with the present disclosure.
Figure 5B:
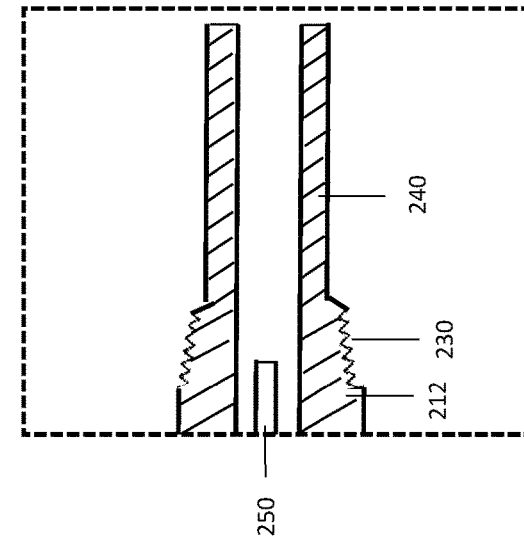
FIG. 5B is an enlarged cross-sectional view of the connecting element of the antenna module of FIG. 5A.
Figure 6C:
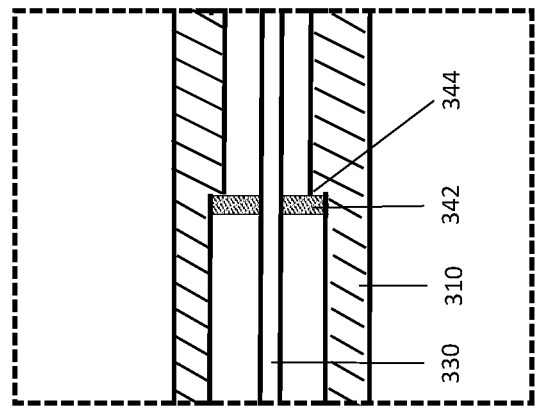
FIG. 6C is an enlarged cross-sectional view of the opposite end of the spacer module of FIG. 6A, in accordance with the present disclosure.
Figure 6A:
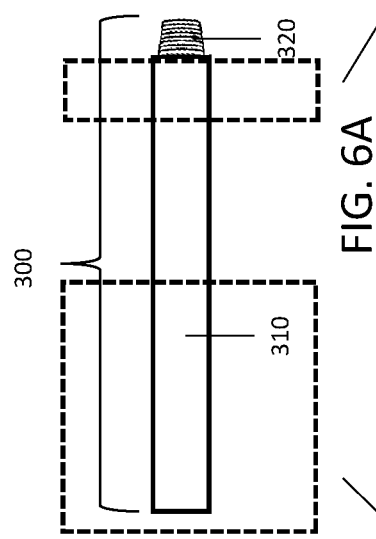
FIG. 6A is a schematic drawing of the spacer module of FIG. 2A disconnected from the antenna modules of FIG. 2A, in accordance with the present disclosure.

FIG. 5A and FIG. 6A are schematic drawings of the antenna module 202 and the spacer module 300, respectively, of FIG. 4A, disconnected from each other. Turning to FIG. 5A, the antenna module 202 comprises an antenna sub 212 with at least one antenna 222 mounted thereon or therein, a threaded inner pin connector 230 formed on the external surface of the antenna sub 212 and located axially between antenna 222 and retainer 240. Both the inner pin connector 230 and the retainer 240 are formed from an end portion of the antenna sub 212. Furthermore, the inner pin connector 230 is formed such that it can be connected to a standard API box connector, achieving the same mechanical requirements as a standard API pin connector in conformance with API specifications (e.g., see FIG. 4B). FIG. 5B is an expanded cross-sectional view of the connection area outlined by dashed lines on FIG. 5A. A probe or a pressure barrel 250 housing one or more electrical wires and an electrical connector (not shown) such as those found in downhole rotatable connectors may be disposed within antenna sub 212, preferably centralized.

Figure 6B:
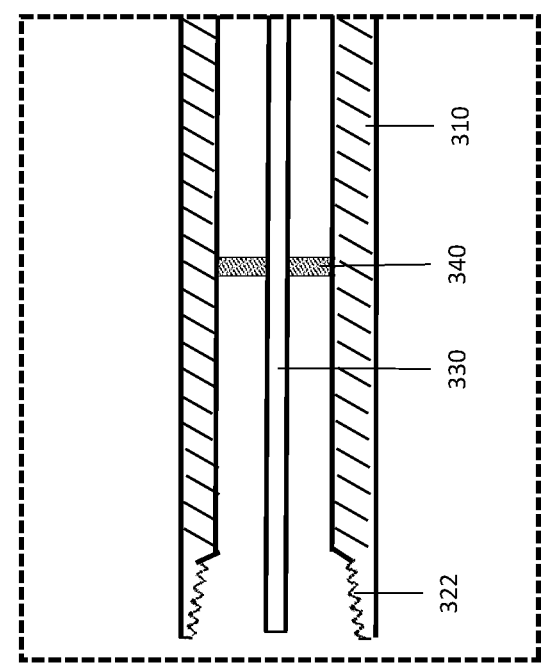
FIG. 6B is an enlarged cross-sectional view of one end of the spacer module of FIG. 6A, in accordance with the present disclosure.

Turning to FIG. 6A, a spacer module 300 comprises a spacer sub 310 with a standard API pin connector 320. FIG. 6B is an enlarged cross-sectional view of the upper (or left end) connection area outlined by the larger area set of dashed lines in FIG. 6A. FIG. 6B shows a probe or a pressure barrel assembly 330 connected by one or more pressure barrels like, but not limited to, those commonly used to house batteries, electronics, and sensors in MWD tools. For example, the pressure barrel may comprise one or more battery units similar to those commonly used in MWD tools to provide electrical power to one or more antenna subs. The pressure barrel assembly has at least one centralizer 340 to position and maintain the pressure barrel assembly 330 centered within the spacer sub 310 once disposed in the spacer sub 310. The centralizer 340 may be affixed or mounted to the pressure barrel assembly 330 in any suitable manner. The centralizer 340 has channels (not shown) to allow for mudflow within the spacer sub 310. The contents of the pressure barrel assembly 330 are protected from the drilling mud flowing between the pressure barrel assembly 330 and the interior wall of spacer sub 310. Electrical conductors within the pressure barrel assembly 330 pass through a bulkhead to electrical connectors (such as commonly used downhole rotatable connectors (not shown)) on both ends of the pressure barrel assembly 330. One or more of the electrical conductors provide at least one of electrical power path, ground path, or a communication path.

FIG. 6C is an enlarged cross-sectional view of the lower (or right) end of spacer sub 300, as indicated by the smaller area set of dashed lines in FIG. 6A. FIG. 6C shows the spacer sub 310 of the spacer module 300 further comprises a landing shoulder 344 formed on the inner surface of spacer sub 310 near the lower end, and the pressure barrel assembly 330 further comprises a landing centralizer 342 affixed to the lower end of the pressure barrel assembly 330. When the pressure barrel assembly 330 is lowered into the spacer sub 310 of spacer module 300, landing centralizer 342 lands on landing shoulder 344. With landing shoulder 344 providing support from below and retainer 240 holding from above, the pressure barrel assembly 330 is held fixed and any axial motion relative to the sub 310 is prevented.

A spacer module 300 provides a flexible way to space antenna modules apart by some desired distance and still keep the tools in the bottom hole assembly electrically connected. That may be particularly useful if there are no downhole measurement tools available to provide a desired spacing. As mentioned above, a pressure barrel assembly 330 may comprise a battery module housing one or more batteries to provide power to the antenna module(s) next to it or to other tools in the tool string. In the situation where there is a downhole measurement tool available to space two antenna modules apart in a desired spacing, a spacer module 300 may still be used to house batteries for power to an antenna module 202. In the situation where there is a downhole measurement tool available to space two antenna modules apart in a desired spacing and enough power can be provided by other sources such as a MWD turbine generator in the tool string, a spacer module 300 can be made as short as possible to serve as an adaptor to connect the antenna module 202, using an inner pin connector 230 from the upper side and another downhole measurement tool from the lower side, to keep the tools on the upper and lower sides in the bottom hole assembly electrically connected.

The spacer module 300 discussed above is probe-based and may be assembled on the rig floor while making up the bottom hole assembly. However, those skilled in the art will recognize that the spacer module 300 can also be designed and assembled in other ways.

Although antenna module 202 is shown connected to the upper end of spacer module 300, which is a preferable configuration from an operational point of view, one may also connect antenna module 202 at the lower end by modifying in obvious ways. For example, when antenna module 202 is connected from the lower end, the retainer 240 is modified to function as a landing base for the pressure barrel assembly 330.

In accordance with at least one embodiment, a modular system comprises an electrical path for a signal carrying clock information to be communicated from one antenna module to another antenna module. In one implementation, an ADC sampling clock signal is sent from one antenna module having an antenna transmitting an electromagnetic signal to another antenna module having an antenna receiving the signal. In another implementation, a receiver clock signal is sent from one antenna module having a receiver antenna to another antenna module having a transmitter antenna transmitting an electromagnetic signal at a frequency based on the receiver clock signal. This ensures the correct amplitude and phase measurements can be obtained on the antenna module receiving the signal even if the two clocks on the two antenna modules are not synchronized (e.g., due to different drifts of the two clocks). In accordance with at least one embodiment, a modular system comprises an electrical path that allows a local oscillator signal to be sent from one antenna module transmitting an electromagnetic signal to another antenna module receiving the signal, wherein the local oscillator signal is input into an electronic mixer on the antenna module receiving the signal and combined with the signal received (as another input) to generate an intermediate frequency signal after a low pass filter. The intermediate frequency has a lower frequency than the frequency of the electromagnetic signal transmitted by the transmitter antenna.

FIG. 7A is a schematic drawing of the modular system of FIG. 2A having two antenna modules 200 and 202 spaced apart by a spacer module 300. The first antenna module 200 comprises an antenna 220 having a tilted magnetic moment 260 (again, oriented neither parallel nor orthogonal to the longitudinal axis of the first antenna sub 210). The second antenna module 202 comprises an antenna 222 having an axial magnetic moment 262 (again, oriented substantially parallel to the longitudinal axis of the second antenna sub 212).

FIG. 7B is a schematic drawing of the modular system of FIG. 2A, but with additional antennas in one antenna module and showing the direction of the magnetic moment of each antenna. Antenna modules 200 and 202 are spaced apart by a spacer module 300. The first antenna module 200 comprises an antenna 220 having a tilted magnetic moment 260; the second antenna module comprises a first antenna 222, a second antenna 224, and a third antenna 226. The first antenna 222 has an axial magnetic moment 262, the second antenna 224 has a tilted magnetic moment 264, and the third antenna 226 has a tilted magnetic moment 266. The magnetic moments 260, 264, and 266 are in different azimuth planes. All the antennas can operate at multiple frequencies suitable for well placement and formation evaluation applications.

Figure 8A:
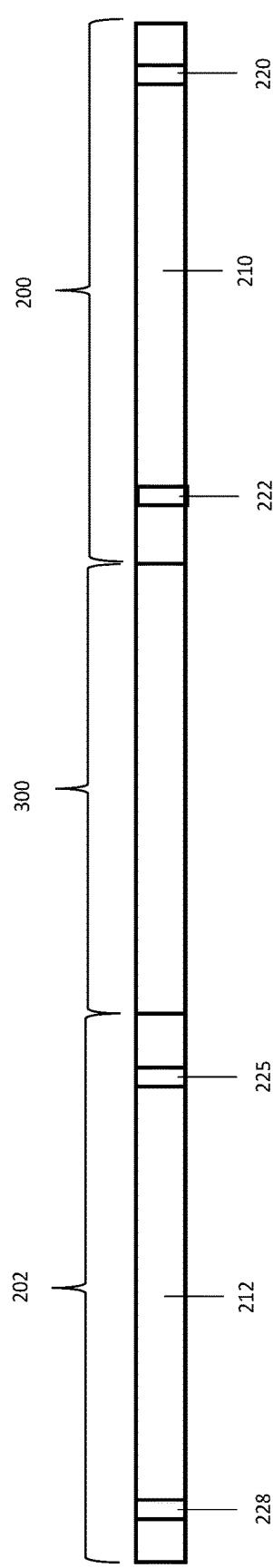
FIG. 8A is a schematic drawing of an alternative embodiment of a modular system having two antenna modules spaced apart by a spacer module, in accordance with the present disclosure.

FIG. 8A is a schematic drawing of an example modular system having two antenna modules 200 and 202 spaced apart by a spacer module 300. The first antenna module 200 comprises antenna 220 and antenna 222, wherein antenna 220 and antenna 222 are spaced apart preferably as much as possible towards opposite ends of the antenna module 200 to maximize the spatial distance between them, e.g., more than half the length of antenna module 200, thereby achieving the largest possible depth of investigation or detection range. The second antenna module 202 comprises an antenna 225 and an antenna 228, wherein antenna 225 and antenna 228 are spaced apart towards opposite ends of the antenna module 202. Antennas 225 and 228 are preferably separated by more than half the length of antenna module 202. All the antennas can operate at multiple frequencies suitable for well placement and formation evaluation applications. Note that although both antenna modules shown in FIG. 8A have two antennas, one of the antenna modules may have only one antenna. Furthermore, although in FIG. 8A the two antenna modules are spaced apart by a spacer, the two antenna modules may be connected without a spacer in between. Both antenna modules may use standard pin or box connectors without an inner pin or inner box connector. The configuration maximizing the spacing between, e.g., antennas 220, 222 in antenna module 200 makes space available to place other sensors and/or sources (including other antennas) between antennas 220, 222. Those sensors or sources allow one to perform one or more other types of LWD measurements such as directional array propagation resistivity measurements, density neutron measurements, sonic measurements, NMR measurements, etc. One antenna module may be disposed proximate to a drill bit.

To achieve a large separation distance, such as around 25 feet or more, between, e.g., antennas 220, 222 in antenna module 200, in one embodiment antenna module 200 comprises two or more sub-modules with different antennas located in different sub-modules to meet requirements such as mechanical straightness precision. All the sub-modules need to be connected and assembled together in the shop to form the antenna module prior to being removeably connected to a tool string as a whole, for reasons such as electrical wiring, antenna alignment, or other electrical, mechanical, and measurement reasons. Any individual sub-module alone cannot be removeably connected to the tool string. As a relatively large spacing between antennas 220 and 222 can be achieved using two or more sub-modules pre-connected and assembled together, the first antenna module 200, with antenna 220 as a transmitter and 222 as a receiver (or vice versa), may be used without the second antenna module 202 to make desired measurements.

Figure 8B:
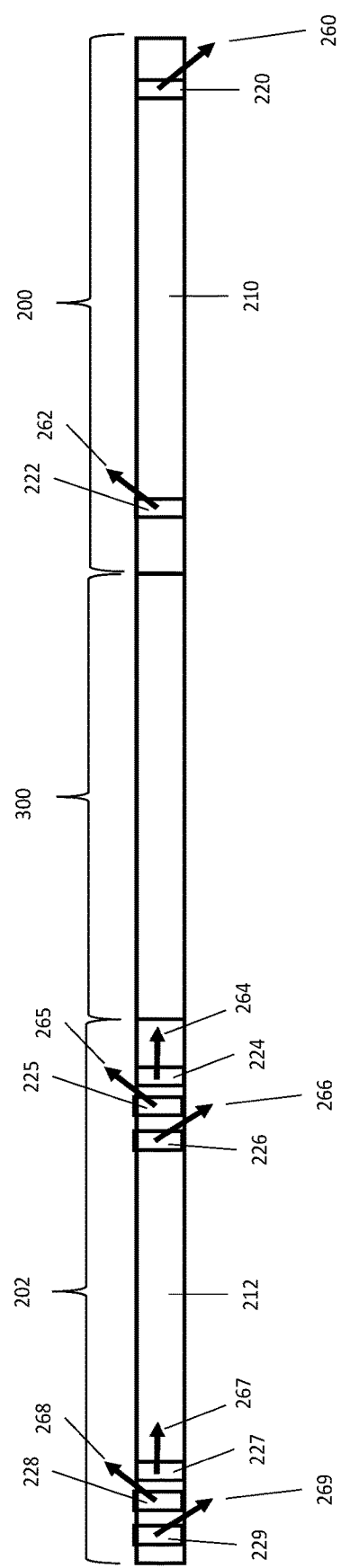
FIG. 8B is a schematic drawing of the modular system of FIG. 8A, but with additional antennas in one antenna module, showing the direction of the magnetic moment of each antenna, in accordance with the present disclosure.

FIG. 8B is a schematic drawing of the modular system of FIG. 8A, but with additional antennas in one antenna module and showing the direction of the magnetic dipole moment of each antenna. The two antenna modules 200 and 202 are spaced apart by a spacer module 300. The first antenna module 200 comprises a transmitter antenna 220 and a transmitter antenna 222, each having a tilted magnetic moment 260 or 262. The second antenna module 202 comprises a first receiver antenna 224, a second receiver antenna 225, a third receiver antenna 226, a fourth receiver antenna 227, a fifth receiver antenna 228, and a sixth receiver antenna 229. The first antenna 224, the second antenna 225, and the third antenna 226 form an antenna group and are co-located or placed in proximity to each other towards one end of the antenna module 202. The fourth antenna 227, the fifth antenna 228, and the sixth antenna 229 form another antenna group and are co-located or placed in proximity to each other towards the other end of the antenna module 202. Antennas groups on any given antenna module are preferably separated by more than half the length of antenna module. The first antenna 224 has an axial magnetic moment 264, the second antenna 225 has a tilted magnetic moment 265, and the third antenna 226 has a tilted magnetic moment 266. The fourth antenna 227 has an axial magnetic moment 267, the fifth antenna 228 has a tilted magnetic moment 268, and the sixth antenna 229 has a tilted magnetic moment 269. All the antennas can operate at multiple frequencies suitable for well placement and formation evaluation applications. As is understood in the art, under the principle of reciprocity, the roles of transmitter antenna and receiver antenna can be reversed such that, for example, in FIG. 8B the antennas on antenna module 200 can be used as receivers and the antennas on antenna module 202 can be used as transmitters. Furthermore, one may switch transmitter antenna 222 on antenna module 200 with a receiver antenna group (i.e., antenna 227, 228 and 229) on antenna module 202. One can also use one or more transceiver antennas that can function either as a transmitter antenna or as a receiver antenna. While the embodiment in FIG. 8B shows both antenna modules have two antenna groups, one of the antenna modules may have only one antenna group. Furthermore, although in FIG. 8B the two antenna modules are spaced apart by a spacer, the two antenna modules may be connected without a spacer in between. Both antenna modules may use standard pin or box connectors without an inner pin or inner box connector. The configuration maximizing the spacing between two antenna groups makes space available to place other sensors and/or sources in between, e.g., antennas 220, 222 and thereby to perform one or more other types of LWD measurements such as directional array propagation resistivity measurements, density neutron measurements, sonic measurements, NMR measurements, etc. One antenna module may be disposed proximate to a drill bit.

As described above, to achieve a large spatial distance, such as around 25 feet or more between two antenna groups in an antenna module, in one embodiment the antenna module comprises two or more sub-modules with each antenna group located in different sub-modules to meet requirements such as mechanical straightness precision requirements. All the sub-modules need to be connected and assembled together in the shop to form the antenna module prior to being removeably connected to a tool string as a whole, for reasons such as electrical wiring, antenna alignment, or other electrical, mechanical, and measurement reasons. Any individual sub-module alone cannot be removeably connected to the tool string. As a relative large spacing between the two antenna groups can be achieved using two or more sub-modules pre-connected and assembled together, one antenna module, with one antenna group as a transmitter antenna group and another antenna group as a receiver group (or vice versa), may be used without another antenna module to make desired measurements.

Figure 9C:
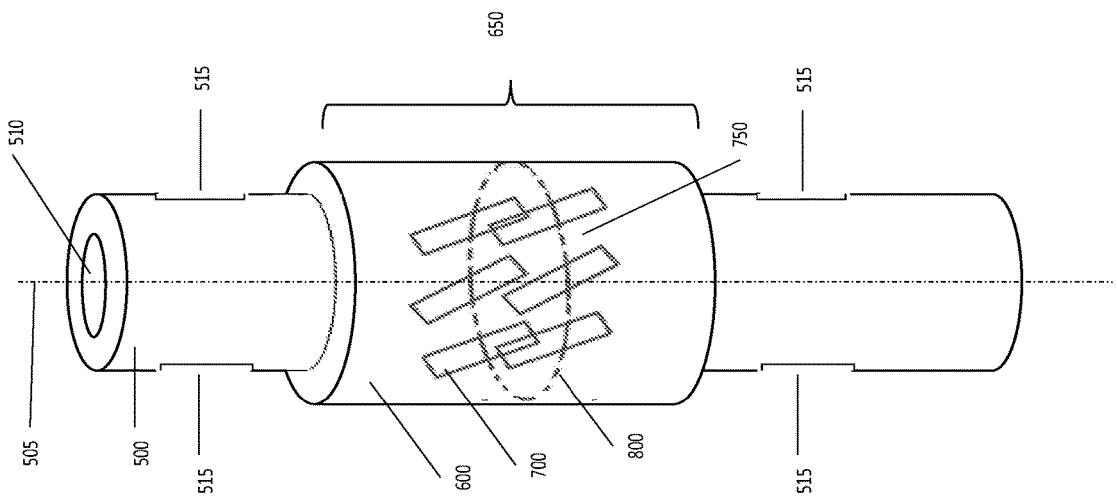
FIG. 9C is a schematic drawing of the antenna sleeve of FIG. 9A disposed on the antenna sub of FIG. 9B, in accordance with the present disclosure.
Figure 9B:
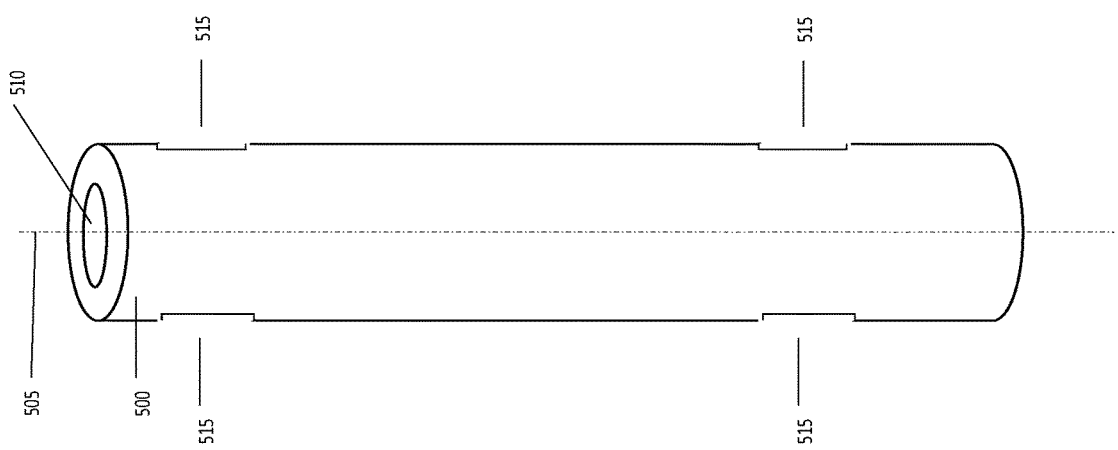
FIG. 9B is a schematic drawing of an antenna sub for the replaceable antenna assembly of FIG. 9A, in accordance with the present disclosure.
Figure 9A:
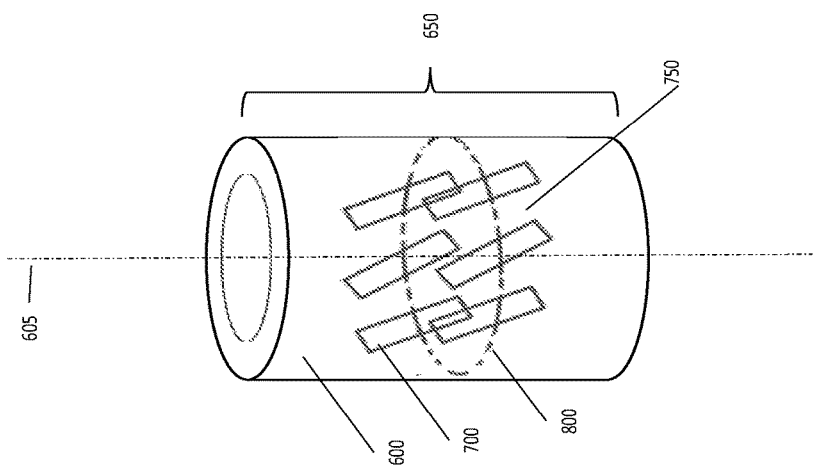
FIG. 9A is a schematic drawing of an antenna sleeve for an embodiment of a replaceable antenna assembly, in accordance with the present disclosure.

FIG. 9A is a schematic drawing of an antenna sleeve for an embodiment of a replaceable antenna assembly. FIG. 9A shows an example of a slide-on antenna. In this embodiment, slide-on antenna 650 comprises a metallic tubular mechanical support 600 having a longitudinal axis 605, an outer surface, and an inner surface. Support 600 has a plurality of grooves 700 of reduced radial dimension relative to the outer surface of support 600 spaced around tubular support 600, and a plurality of lands 750 of radial dimension similar to the outer surface of support 600 separating two neighboring grooves. Slide-on antenna 650 also includes an antenna pathway (not shown) traversing the plurality of grooves and plurality of lands around the tubular support 600, and a coil 800 disposed in the antenna pathway. It should be noted, while the grooves 700 shown are all tilted with respect to the axis 605, other orientations of one or more of the grooves, such as axial or transverse, can be used. (Groove orientations are defined similar to coil orientations above, but with the groove length establishing the groove direction instead of the coil magnetic dipole moment.) Furthermore, while an axial coil is shown, other orientations such as a titled coil or a transverse coil can be used. FIG. 9B shows a replaceable antenna sub 500 having a longitudinal axis 505 and a flow bore 510. The sub 500 also comprises a plurality of recesses 515 distributed around the exterior surface of sub 500. FIG. 9C is a schematic drawing of the antenna sleeve of FIG. 9A disposed on the antenna sub of FIG. 9B. Slide-on antenna 650 is installed on replaceable antenna sub 500, wherein the tubular support longitudinal axis 605 substantially aligns with the replaceable antenna sub longitudinal axis 505. It should be noted that, at least in the slide-on section, the inner diameter of the tubular support 600 is substantially the same as, but slightly larger than, the outer diameter of the replaceable antenna sub 500.

Figure 9E:
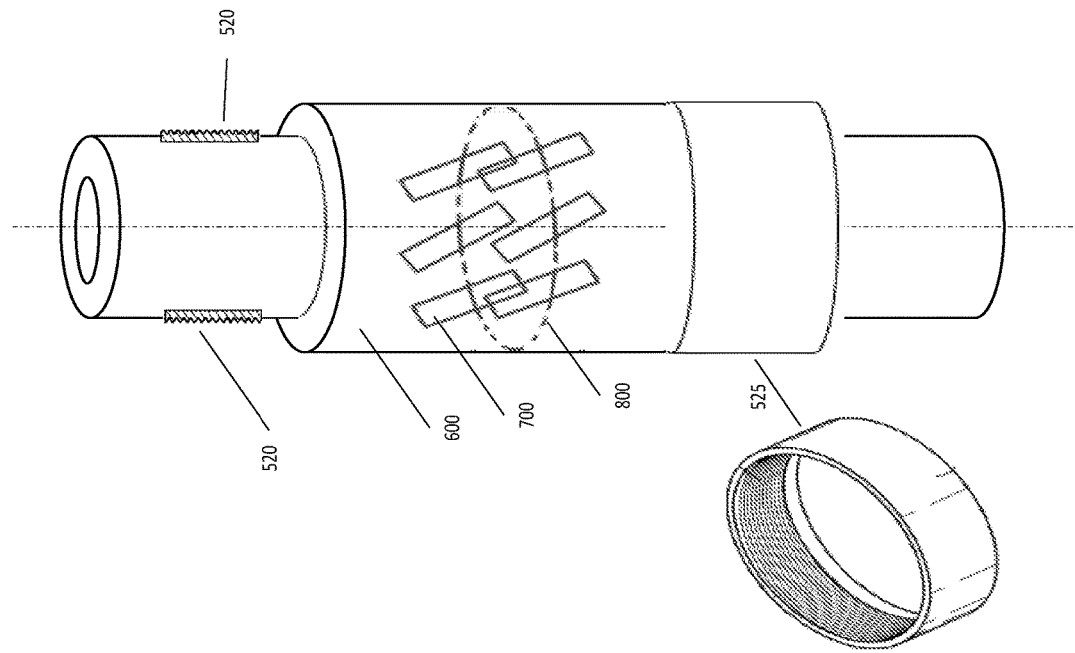
FIG. 9E is a schematic drawing of the replaceable antenna assembly of FIGS. 9A-9D showing a retainer ring secured onto the antenna sub and in butting engagement with one end of the antenna sleeve, in accordance with the present disclosure.
Figure 9D:
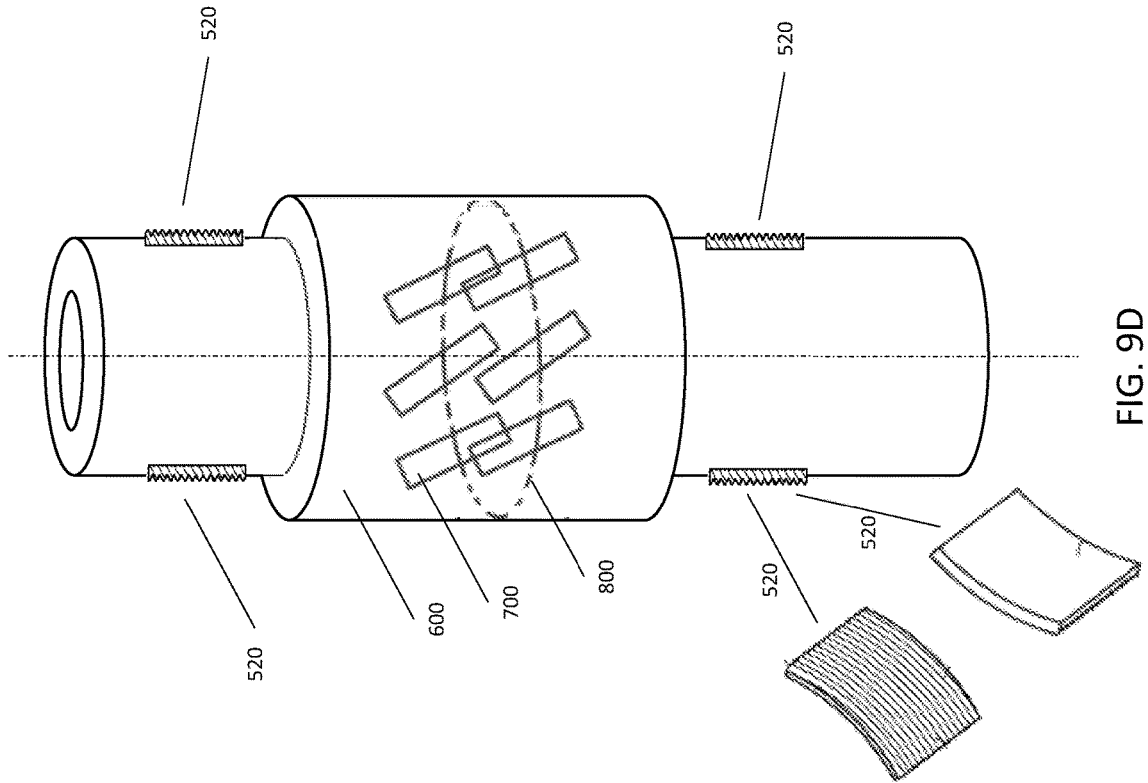
FIG. 9D is a schematic drawing of threaded inserts disposed in recesses in the antenna sub of FIG. 9B, in accordance with the present disclosure.

In FIG. 9D, inserts 520 with threads on one face are disposed in recesses 515. (FIG. 9D also shows, in perspective view, the threaded and unthreaded faces of inserts 520 when not disposed in recesses 515.) A retainer ring 525 with threads on its inner surface is threaded onto inserts 520 as shown in FIG. 9E. (FIG. 9E also shows, in perspective view, an unattached retainer ring 525.) Another retainer ring 525 is threaded onto the inserts 520 on the opposite end of replaceable antenna sub 500. Upper and lower retainer rings 525 secure slide-on antenna 650 in a fixed location on the sub 500. In accordance with at least one embodiment, the replaceable antenna assembly further comprises a key (not shown) placed between the outer surface of the sub 500 and the inner surface of the tubular support 600 to fix the relative azimuthal orientation between the two.

Figure 10C:
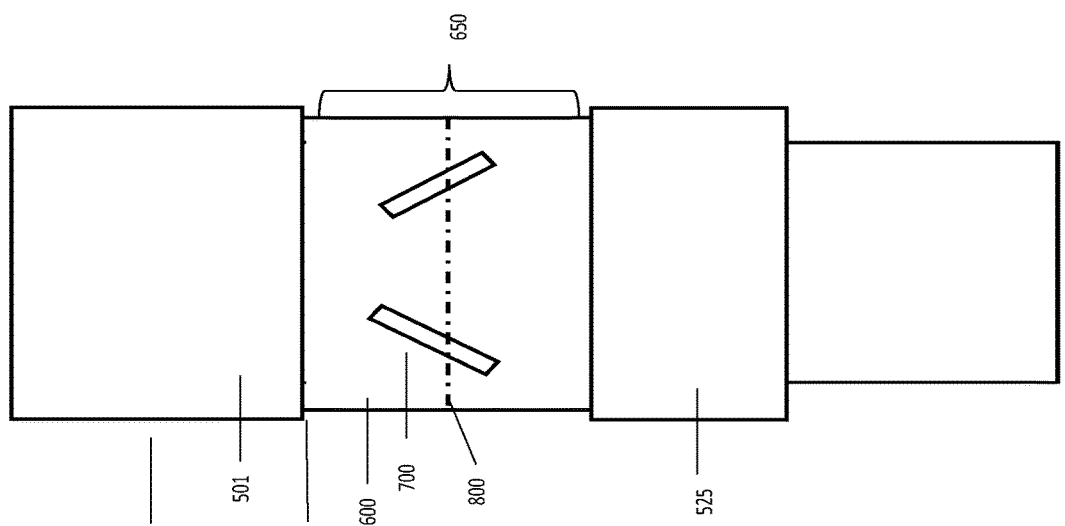
FIG. 10C is a schematic drawing of the alternative replaceable antenna assembly of FIGS. 10A-10B showing a retainer ring secured onto the alternative antenna sub and in butting engagement with one end of the antenna sleeve, in accordance with the present disclosure.
Figure 10B:
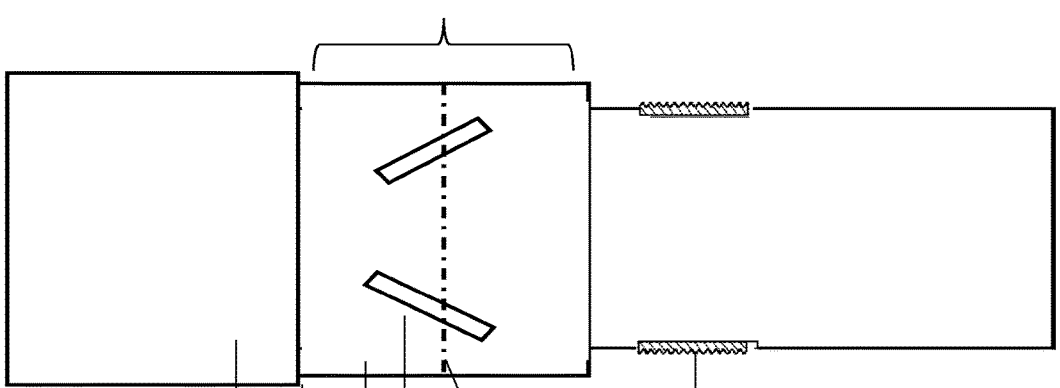
FIG. 10B is a schematic drawing showing an antenna sleeve disposed on the alternative antenna sub of FIG. 10A and threaded inserts disposed in recesses in the alternative antenna sub, in accordance with the present disclosure.
Figure 10A:
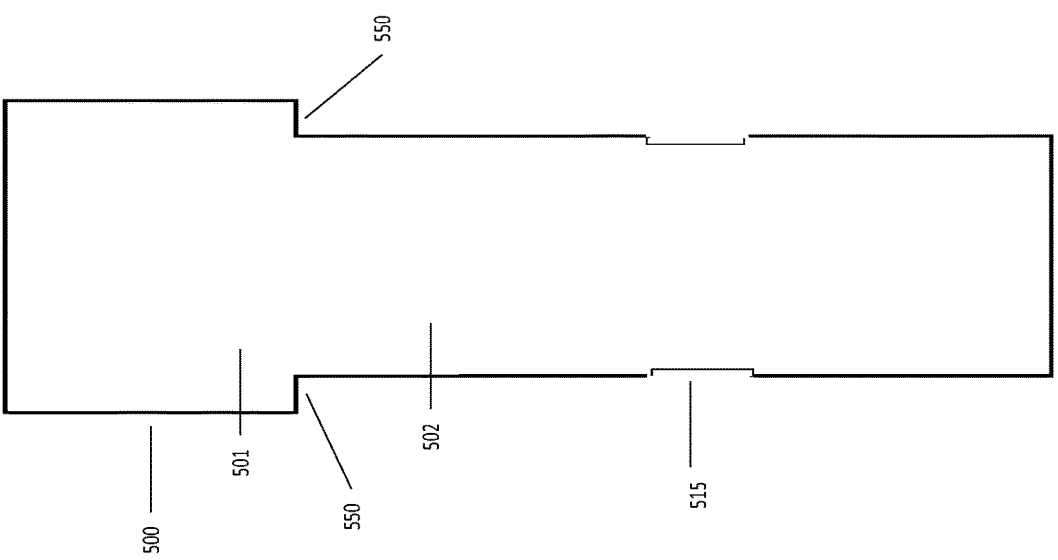
FIG. 10A is a schematic drawing of an alternative antenna sub for an alternative embodiment of a replaceable antenna assembly, in accordance with the present disclosure.

FIG. 10A is a schematic drawing of an alternative replaceable antenna sub for an alternative embodiment of a replaceable antenna assembly. In this embodiment the replaceable antenna sub 500 has a shoulder feature 550 that delineates two sections 501 and 502 having different outer diameters, as shown in FIG. 10A. When a slide-on antenna 650 is installed on the sub 500, as shown in FIG. 10B, the shoulder 550 provides a landing support to limit the axial position of the slide-on antenna 650 from one side, and a retainer ring 525 secures the slide-on antenna 650 and fixes its axial position relative to the sub 500 from the other side, as shown in FIG. 10C. Although only one slide-on antenna 650 is shown in FIGS. 9A-9E and FIGS. 10A-10C, multiple slide-on antennas can be installed on a sub either in proximity to each other or spaced apart along the longitudinal axis of the sub, and secured by one or more retainer rings 525.

Figure 11A:
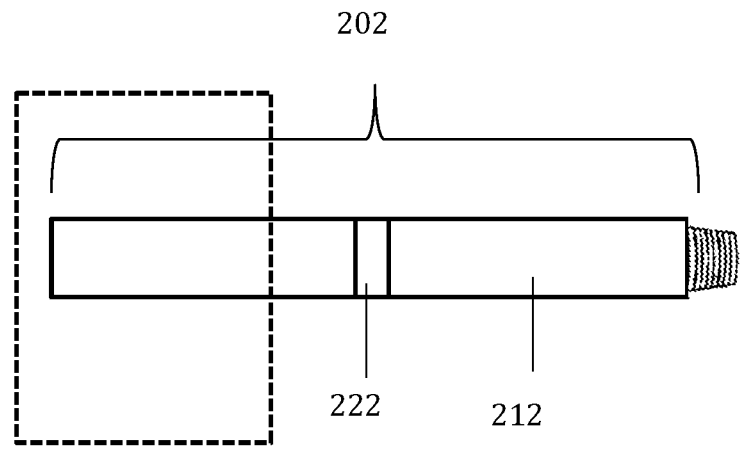
FIG. 11A is a schematic side view of an antenna module having an inner box connector, in accordance with the present disclosure.
Figure 11B:
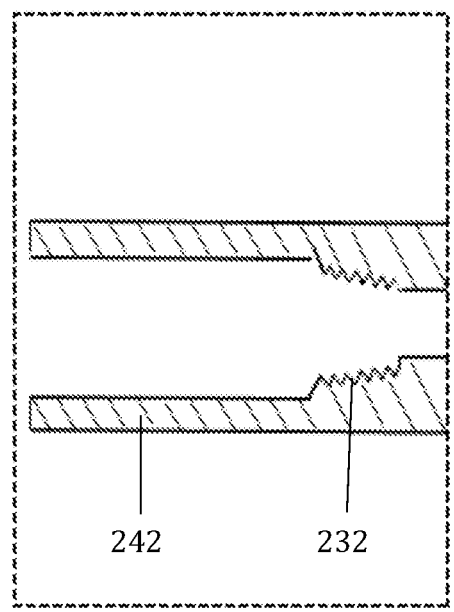
FIG. 11B is an enlarged cross-sectional view of the connection area outlined by dashed lines on FIG. 11A, in accordance with the present disclosure.

FIG. 11A is a schematic side view of an antenna module having an inner box connector, and FIG. 11B is an enlarged cross-sectional view of the connection area outlined by dashed lines on FIG. 11A. The antenna module 202 comprises an antenna sub 212 with at least one antenna 222 mounted thereon or therein. As shown in FIG. 11B, a threaded inner box connector 232 is formed on the interior surface of the antenna sub 212 and located axially between antenna 222 and an alignment end 242 of antenna sub 212. Both the inner box connector 232 and the alignment end 242 are formed from an end portion of the antenna sub 212.

As is understood in the art, a processor can be incorporated into the system. The processor may be carried on the downhole tool or it may be located on the surface, sending data or instructions to or receiving and processing data from wired or wireless components. The processor may comprise a non-transitory, computer-readable storage medium, which has stored therein one or more programs, the one or more programs comprising instructions to be executed by the processor.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:
1. A downhole apparatus, comprising:
   two or more antenna modules incorporated into a single drill string having a bore therethrough, the antenna modules being capable of transmitting and/or receiv- ing, between or among the antenna modules, an electromagnetic signal that passes through a borehole and/or a subsurface formation, each antenna module comprising an antenna sub through which the bore passes, an antenna, either one or two inner connectors, and either a retainer end adapted to penetrate into the bore, an alignment end adapted to receive and guide a retainer end of a different antenna module, or both a retainer end adapted to penetrate into the bore and an alignment end adapted to receive and guide a retainer end of a different antenna module, wherein any particular inner connector of any particular one of the antenna modules is formed on the antenna sub of that particular antenna module axially inward some distance from an end of the antenna sub between the antenna of that particular antenna module and either the retainer end of that particular antenna module or the alignment end of that particular antenna module.

2. The apparatus of claim 1, wherein the inner connector is a threaded pin connector.

3. The apparatus of claim 2, further comprising a spacer module having a probe or pressure barrel assembly disposed therein, the probe or pressure barrel assembly having a first centralizer in butting engagement with the retainer end and a second centralizer in butting engagement with a landing shoulder of the spacer module.

4. The apparatus of claim 1, wherein the inner connector is a threaded box connector.

5. The apparatus of claim 1, wherein at least one of the antennas is a replaceable antenna.

6. The apparatus of claim 1, further comprising a battery module providing electrical power to at least one of the antenna modules.

7. The apparatus of claim 1, wherein a first antenna module and a second antenna module, both selected from the two or more antenna modules, are spaced apart by one or more spacer modules, battery modules, spacer-battery modules, downhole tools, or any combination of those.

8. The apparatus of claim 7, further comprising an electrical pathway providing electrical connection between the first antenna module and the second antenna module.

9. A downhole apparatus, comprising:
a first antenna module disposed in a wellbore, the first antenna module having a first antenna group and a second antenna group located towards opposite ends of the first antenna module and spaced apart by more than half the length of the first antenna module, wherein each of the first and second antenna groups has one or more antennas and, for each of those antenna groups having two or more antennas, the antennas of that antenna group are co-located or in proximity to one another; and
a second antenna module disposed in the same wellbore, the second antenna module having a third antenna group comprising either one antenna or two or more antennas, the two or more antennas being co-located or in proximity to one another;
wherein the first antenna module and the second antenna module are capable of transmitting and/or receiving, between the antenna modules, an electromagnetic signal that passes through a borehole and/or a subsurface formation, and at least one of the antenna modules further comprising an antenna sub through which a bore passes, either one or two inner connectors, and either a retainer end adapted to penetrate into the bore, an alignment end adapted to receive and guide a retainer end of a different antenna module, or both a retainer end adapted to penetrate into the bore and an alignment end adapted to receive and guide a retainer end of a different antenna module, wherein any particular inner connector of any particular one of the antenna modules having inner connectors is formed on the antenna sub of that particular antenna module axially inward some distance from an end of the antenna sub between one of the antenna groups of that particular antenna module and either the retainer end of that particular antenna module or the alignment end of that particular antenna module.

10. The downhole apparatus of claim 9, wherein the first antenna group has a first transmitter antenna with a tilted magnetic dipole moment, the second antenna group has a second transmitter antenna with a tilted magnetic dipole moment, and the third antenna group has a first receiver antenna with an axial magnetic dipole moment and second and third receiver antennas with tilted magnetic dipole moments.

11. The downhole apparatus of claim 9, wherein the first antenna group has a first transmitter antenna with a tilted magnetic dipole moment, the second antenna group has a first receiver antenna with an axial magnetic dipole moment and second and third receiver antennas with tilted magnetic dipole moments, and the third antenna group has a second transmitter antenna with a tilted magnetic dipole moment.

12. The downhole apparatus of claim 9, wherein the second antenna module is disposed proximate to a drill bit.

13. The downhole apparatus of claim 9, wherein the first antenna module and the second antenna module are spaced apart by one or more spacer modules, battery modules, spacer-battery modules, downhole tools, or any combination of those.

14. The downhole apparatus of claim 9, wherein the second antenna module further comprises a fourth antenna group, the third antenna group and the fourth antenna group being located towards opposite ends of the second antenna module and spaced apart by more than half the length of the second antenna module, wherein the fourth antenna group comprises either one antenna or two or more antennas, the two or more antennas being co-located or in proximity to one another.

15. The downhole apparatus of claim 14, wherein the first antenna group has a first transmitter antenna with a tilted magnetic dipole moment, the second antenna group has a second transmitter antenna with a tilted magnetic dipole moment, the third antenna group has a first receiver antenna with an axial magnetic dipole moment and second and third receiver antennas with tilted magnetic dipole moments, and the fourth antenna group has a fourth receiver antenna with an axial magnetic dipole moment and fifth and sixth receiver antennas with tilted magnetic dipole moments.

16. The downhole apparatus of claim 14, wherein the first antenna group has a first transmitter antenna with a tilted magnetic dipole moment, the second antenna group has a first receiver antenna with an axial magnetic dipole moment and second and third receiver antennas with tilted magnetic dipole moments, the third antenna group has a second transmitter antenna with a tilted magnetic dipole moment, and the fourth antenna group has a fourth receiver antenna with an axial magnetic dipole moment and fifth and sixth receiver antennas with tilted magnetic moments.

17. The downhole apparatus of claim 9, further comprising one or more sensors selected from the group consisting of: directional array propagation resistivity sensors, density neutron sensors, sonic sensors, and nuclear magnetic resonance sensors, wherein the one or more sensors are located between the first antenna group and the second antenna group of the first antenna module.

18. The downhole apparatus of claim 9, wherein the first antenna module is pre-assembled and comprises two or more sub-modules, the first antenna group and the second antenna group are located on different sub-modules, and the first antenna module can be removeably connected to a tool string, but none of the sub-modules individually can be removeably connected to the tool string.

19. A method, comprising:
providing a downhole electromagnetic modular system having two or more antenna modules incorporated into a single drill string having a bore therethrough, the antenna modules being capable of transmitting and/or receiving, between or among the antenna modules, an electromagnetic signal that passes through a borehole and/or a subsurface formation, each antenna module comprising an antenna sub through which the bore passes, an antenna, either one or two inner connectors, and either a retainer end adapted to penetrate into the bore, an alignment end adapted to receive and guide a retainer end of a different antenna module, or both a retainer end adapted to penetrate into the bore and an alignment end adapted to receive and guide a retainer end of a different antenna module, wherein any particular inner connector of any particular one of the antenna modules is formed on the antenna sub of that particular antenna module axially inward some distance from an end of the antenna sub between the antenna of that particular antenna module and either the retainer end of that particular antenna module or the alignment end of that particular antenna module;
disposing the modular system in a wellbore penetrating a formation;
making measurements using the modular system; and
inferring properties of the formation using the obtained measurements.

20. The method of claim 19, further comprising providing electrical power to at least one of the antenna modules and/or a downhole tool with a battery module.

21. The method of claim 19, further comprising disposing one or more spacer modules, battery modules, spacer-battery modules, and/or downhole tools between the first antenna module and the second antenna module, thereby producing a desired separation distance between the first antenna module and the second antenna module while maintaining an electrical pathway throughout the modular system.

22. The method of claim 19, further comprising sending a signal carrying clock frequency information from one antenna module to another antenna module.

* * * * *